Figure 1:
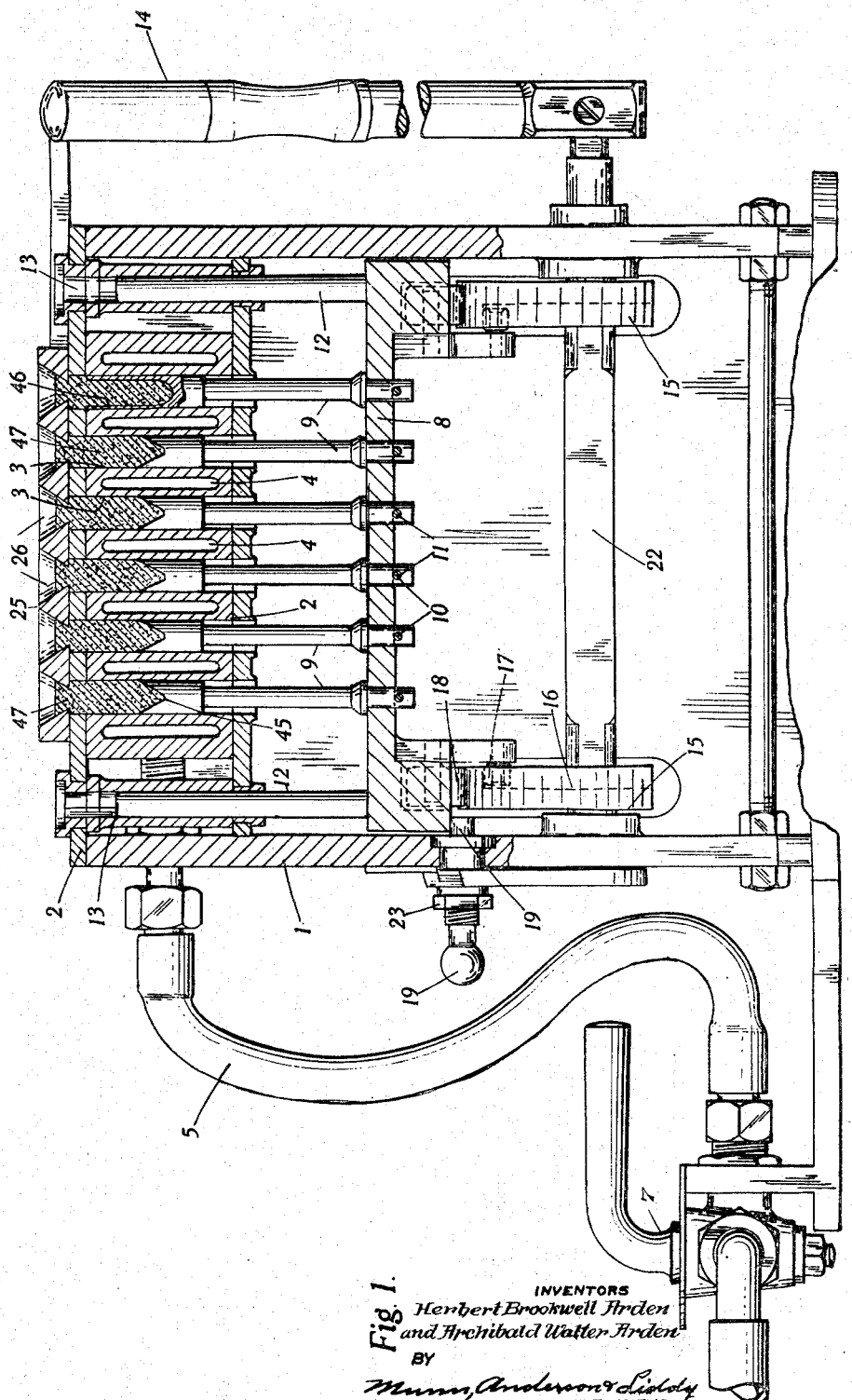

INVENTORS
Herbert Brookwell Arden
and Archibald Walter Arden
BY
Munn, Anderson & Liddy
ATTORNEYS Patented Oct. 13, 1942

2,298,913

UNITED STATES PATENT OFFICE 2,298,913

MOLDING DEVICE

Herbert Brookwell Arden and Archibald Walter Arden, London, England

Application September 6, 1939, Serial No. 293,584
In Great Britain September 17, 1938

2 Claims. (Cl. 18—5)

This invention relates to the production and packing of molded articles and is more especially intended for application to the production and packing of articles, such as lipsticks, eyebrow pencils, grease paints, suppositories, pessaries and the like, the features of the invention relating to packing being of especially useful application in the case of molded articles which are relatively soft under normal conditions of temperature and pressure.

It is an object of the invention to provide a molding device including a mold cavity and a member which may close the lower end of the cavity and shape the ends of articles molded therein and may be moved within the cavity to eject the molded articles therefrom.

It is a further object of the invention to provide a molding machine comprising a mold block having a plurality of mold cavities therein, members mounted within the cavities for shaping the ends of articles molded therein and ejecting such articles therefrom, for adjustably determining the relative positions which the end-shaping and ejecting members occupy in the cavities during molding and for permitting them to be separated from the ends of the molded articles before the latter are ejected.

It is a still further object of the invention to provide a device for facilitating the insertion of molded articles into cases or containers comprising a frame or the like by means of which a case or container may be held in alignment with the cavity of a mold so that the molded article may be inserted directly therein by the action of ejecting it from the cavity.

Another object of the invention is the facilitation of the pouring of material into molds and the subsequent removal of surplus material by the use of a pouring frame provided with a number of slots or other suitable apertures which may be aligned above the mold cavities and receive surplus material upon pouring being continued beyond the point at which the cavities become filled: lateral movement of the frame relatively to the mold cavities after the material is set firm results in clean cutting off of the residue, which may be easily removed from the apertures of the frame for re-melting.

With the above and other objects in view, the invention consists in the improved combinations and arrangements contained in the embodiments now to be described in detail, and features of which are set out in the claims which follow.

Figure 2:
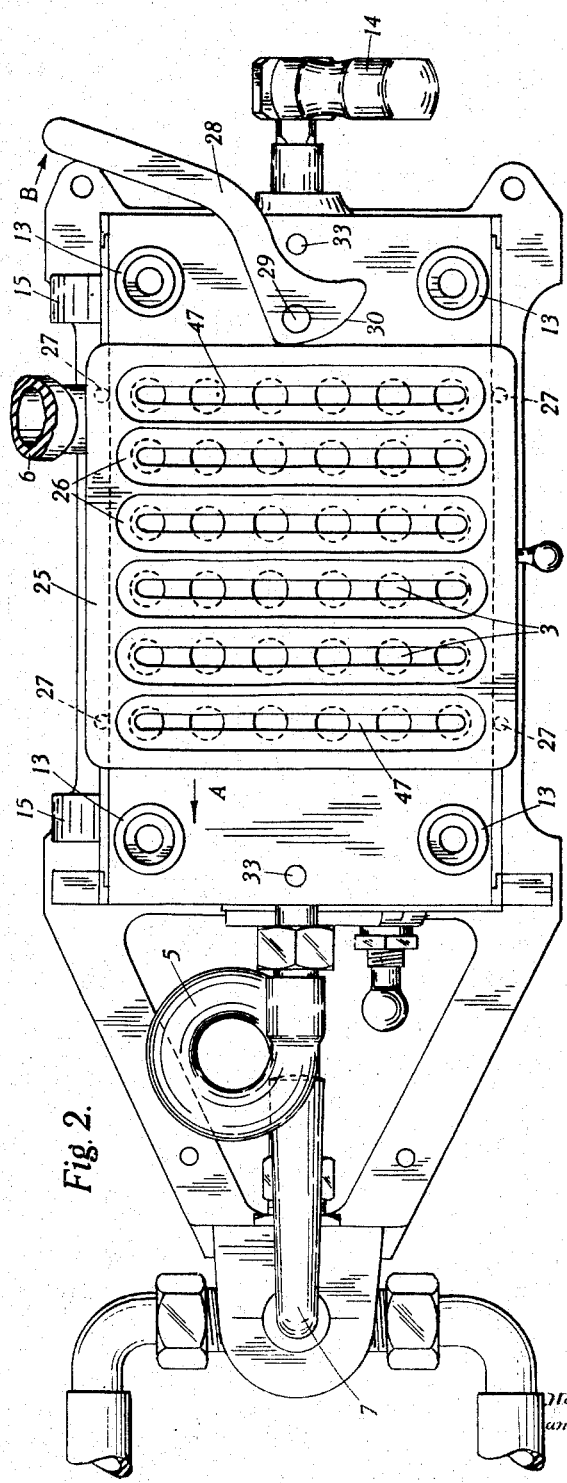
Figure 3:
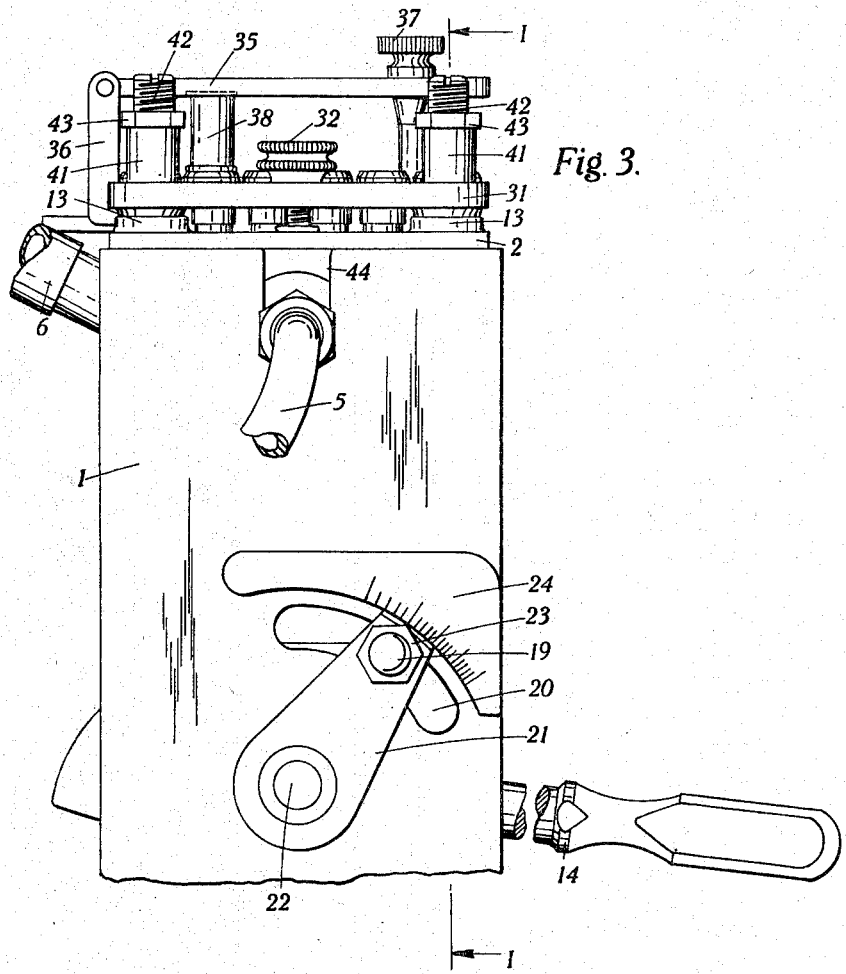
Figure 4:
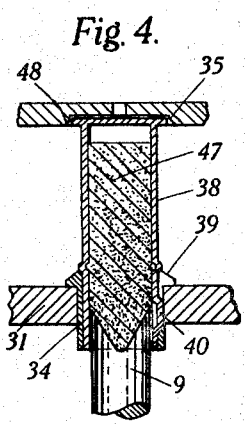

In the drawings:

Figure 1 is an elevational view is section on the line I—I of Figure 3, of a machine combining means for facilitating the pouring of material and the ejection and packing of molded articles showing the parts in the positions which they occupy immediately after pouring of the plastic material, Figure 2 is a plan view of the molding block with the pouring frame in position for pouring, Figure 3 is a side elevation of the machine, with the parts in the positions which they occupy upon ejection of the molded articles into their containers, and Figure 4 is a section to an enlarged scale illustrating the reception of a molded article by a case or container the various parts being in the positions illustrated by Fig. 3.

The machine comprises a casing 1, in the upper part of which is mounted a mold block 2 having a number of vertical bores or cavities 3, the walls of which are separated by spaces 4, through which heating or cooling medium can be passed.

The spaces 4 communicate with inlet and outlet pipes 5 and 6 respectively, the inlet pipe 5 being associated with a three-way cock 7 by means of which heating or cooling medium may be passed through the block, or the pipe may be closed.

Any suitable heating or cooling medium may be passed through the block: thus air, hot or cold, or steam might be used but hot and cold water will probably be preferred.

Beneath the mold block there is mounted in the casing 1 a platform 8 carrying a number of vertically arranged pegs or plungers 9, each of which registers with one of the bores or cavities 3 and provides a bottom closure for it during the molding operation: the portions of the plungers which provide bottom closures for the cavities 3 are shaped appropriately to impart the desired shape to the ends of the molded articles. The five plungers shown on the left in Figure 1 are intended for use in the molding of lipsticks for which the cavities 3 themselves form the molds the upper ends of the plungers being shaped as shown at 45 to give the required shape to the end of the molded article. The plunger shown on the right is intended for the molding of bullet-nosed articles, such as suppositories or pessaries, and includes a hollow portion 46 which forms the actual wall of the space in which the article is molded.

The machine illustrated is adapted for the simultaneous molding of thirty-six articles, the cavities and plungers being arranged in six rows of six each. The plungers in a row are connected, beneath the platform 8, by a rod 10 which passes through holes 11 in the lower portions of the plungers: these rods not only lock the plungers against upward movement relatively to the platform but also serve to prevent rotation of the plungers about their own axes, maintaining them in the correct angular positions.

The platform 8 is arranged for vertical movement in the casing and is guided by means of vertical rods 12 which slide in guide passages formed by tubular members 13 carried by the mold block.

Vertical movement of the platform and plungers is effected by means of a handle 14 outside the casing which may be swung to rock cams 15 inside the casing having flanges 16 which are engaged by rollers 17 and 18 carried by the platform. The rollers 17 engage the underside of the flanges so that, through them, the platform may be positively moved downwards upon appropriate rotation of the cams whilst the rollers 18 engage the upper sides of the flanges so that the platform may be raised upon rotation of the cams in the opposite direction.

The length of the molded product is determined by the positions of the tops of the plungers (or of the bottom of the hollow portion 46 in the case of that on the right in Figure 1) relatively to the tops of the cavities 3 during the molding operation: these positions are in turn determined by means of a spring-pressed plunger 19 which normally projects into the path of the platform and upon which the latter rests during the molding operation.

The spring-pressed plunger projects through an arcuate slot 20 in the side of the casing and is carried by an arm 21 which is pivoted upon the end of the shaft 22 upon which the cams 15 and handle 14 are mounted and which may be locked in various angular positions by means of a locknut 23. A graduated scale 24 adjacent to the arcuate slot indicates the length of molded product to be obtained in accordance with the adjusted angular position of the arm.

When a molding operation is to be undertaken, a pouring frame 25 is placed in position upon the top of the molding block and, if the conditions are such that pre-heating of the molds is necessary, the three-way cock 7 is adjusted to cause heating medium to flow through the spaces 4 in the block.

The pouring frame 25 is in the form of a grid having six slots 26 formed in it so spaced from each other that each can be centred above one row of the cavities 3 when the frame is properly in position on the top of the block. As can be seen from Figures 1 and 2, the slots 26 taper from top to bottom, whilst depending studs 27 are provided, as indicated by dotted lines in Figure 2, to cooperate with the sides of the mold block to guide the frame.

The mass of plastic material, from which the articles are to be molded, is poured into the slots of the pouring frame, whence it passes to the cavities 3 (or the interior of the hollow portions of the plungers 9 in the case of those of the type illustrated on the right in Figure 1), which it fills, and the cock is adjusted to cause cooling medium to flow through the spaces 4: sufficient material is poured to fill part of the slots 26, as well as the cavities 3, as indicated in Figure 1.

When the mass has stood in the molds for the requisite time, the shaped upper ends of the plungers are separated from the solidified lower ends of the molded articles 47 by withdrawing the spring-pressed plunger 19 from the path of the platform 8 and lowering the latter by appropriate actuation of the operating handle 14, any tendency toward downward movement on the part of the molded articles being resisted by their connection to the strips of solidified material remaining in the slots of the pouring frame.

The surplus material is then cut off cleanly from the tops of the molded articles by causing the pouring frame to slide sideways on the top of the mold block in the direction of the arrow A in Figure 2: the studs 27 guide the frame during this movement, which is effected by means of a lever 28 the pivot pin 29 of which projects into a hole in the top of the block and which is caused to pivot in the direction of the arrow B in Figure 2 so that its cam surface 30 acts upon the adjacent edge of the frame.

After the surplus material has been cut off, the molded articles are ready for ejection from the mold cavities and the pouring frame (and the lever 28 also if desired) are removed from the top of the block and their place is taken by a device which holds containers ready to receive the articles which do not require to be touched by hand.

The container-holding device is shown in operative position in Figure 3 and includes a plate 31 which is removably attached to the block by means of members 32 which screw into holes 33 (Fig. 2) in the top of the block.

A number of socket members 34 are mounted in perforations in the plate 31, each so arranged as to be coaxially related to one of the mold cavities 3 and a further plate 35 is hingedly carried by uprights 36 from the plate 31 and has circular recesses 48 formed in one of its faces which come to lie each coaxially above one of the socket members 34 when the plate is in the position shown in Figure 3, in which it is locked by means of a member 37 which screws into the plate 31.

The containers, of which one is shown at 38 in Figure 3, are loaded into the socket members whilst the plate 35 is in raised position, being locked in position by folding the latter to the position of Figure 3 and securing it by the member 37. The socket members are slotted as at 39 to receive positioning projections 40 on the cases.

The cases being in position, the handle 14 is actuated to cause the plungers 9 to rise and eject the articles, which pass straight into the cases.

The plate 31 carries four vertical tubular members 41, each closed by a screw cap 42 and so positioned that its lower end fits into the top of one of the tubular guides 13 provided for the guide rods 12. The members 41 not only help to ensure proper centralization of the plate 31 and associated parts but also provide a means whereby the penetration of the molded articles into their containers may be regulated: by screwing the caps 42 up or down, the height to which the guide rods, and thus the platform and plungers, may rise may be adjusted and thus also the extent to which the molded articles may be caused to penetrate into their containers. Lock-nuts 43 are provided on the caps 42.

It will be understood, that in the normal operation of the machine, articles are simultaneously molded in, and subsequently simultaneously packed in containers by ejection from, all thirty-six mold cavities of the block: for ease of illustration, however, one only of the containers is shown in Figure 3.

The upper part of the casing 1 is slotted, as for example at 44 in Figure 3, for the reception of the inlet and outlet connections of the heating and cooling system so that the mold block may be removed as a whole for repair or exchange, for instance when articles of a different shape or size are to be produced. The plungers 9 also can be removed upon withdrawal of the locking rods 10.

In a modification, the mold cavities might be provided by tubes mounted in a casing, the space within the casing surrounding the tubes providing the jacketing for the reception of heating or cooling medium.

Although means for molding articles and inserting them in cases or containers have been described above in some considerable detail, it is to be understood that such description is given by way of example and that various modifications may be made without departing from the invention.

Although, moreover the whole combination described above forms a very convenient unit, a device in accordance with the invention for holding cases or containers for molded articles may be used in conjunction with less elaborate molding devices. Thus, for example, a device similar in principle to that described might be used to receive articles ejected from a simple mold not forming part of a machine with built-in ejecting means: such a mold could be closed at the bottom by closing means shaped to give the requisite shape to the ends of the product, such closing means being removable to permit the ejection of the articles, singly or all together, by means of pegs or the like. Similarly, the grid-like pouring frame can be used in conjunction with other types of molding machine, with or without means for holding containers, whilst the features providing for separation of the bottom closures of the molds from the solidified articles before ejection thereof can also be used in arrangements not including means for holding containers to receive the articles upon ejection.

We claim:

1. In apparatus for molding articles from molten material, means for holding a case to receive the molded article on ejection from a mold cavity comprising a member having a case or container-receiving aperture therein and a second member mounted for pivotal movement relatively to said first member to and from a position in which it co-operates with said first member to hold a case or container rigidly in alignment with the mold cavity.

2. In apparatus for molding articles from molten material, means for holding a case to receive the molded article on ejection from a mold cavity comprising an apertured member arranged with its apertures in alignment with the mold cavities, a second member mounted for pivotal movement relatively to said first member and having a plurality of recesses in the face thereof adjacent to said first member and locking means for locking said second member with its recesses in alignment with the apertures in said first member.

HERBERT B. ARDEN.
ARCHIBALD W. ARDEN.